(12) United States Patent
Singh et al.

(10) Patent No.: US 11,575,702 B2
(45) Date of Patent: Feb. 7, 2023

(54) SYSTEMS, DEVICES, AND METHODS FOR OBSERVING AND/OR SECURING DATA ACCESS TO A COMPUTER NETWORK

(71) Applicant: ARETE SECURITY INC., Las Vegas, NV (US)

(72) Inventors: Manjit Gombra Singh, Saratoga, CA (US); Gouse Basha Mahammad, San Jose, CA (US)

(73) Assignee: ARETE SECURITY INC., Las Vegas, NV (US)

( * ) Notice: Subject to any disclaimer, the term of this patent is extended or adjusted under 35 U.S.C. 154(b) by 0 days.

(21) Appl. No.: 17/671,577

(22) Filed: Feb. 14, 2022

(65) Prior Publication Data

US 2022/0224711 A1 Jul. 14, 2022

Related U.S. Application Data

(63) Continuation of application No. PCT/US2022/011496, filed on Jan. 6, 2022.
(Continued)

(51) Int. Cl.
*H04L 9/40* (2022.01)

(52) U.S. Cl.
CPC ...... *H04L 63/1433* (2013.01); *H04L 63/0236* (2013.01); *H04L 63/102* (2013.01);
(Continued)

(58) Field of Classification Search
CPC ............. H04L 63/1433; H04L 63/0236; H04L 63/1416; H04L 63/1425; H04L 63/20
(Continued)

(56) References Cited

U.S. PATENT DOCUMENTS

| 7,296,288 B1 * | 11/2007 | Hill | ............ H04L 43/0882 726/2 |
| 8,595,834 B2 * | 11/2013 | Xie | ............ G06F 21/552 726/22 |

(Continued)

FOREIGN PATENT DOCUMENTS

WO WO-2022150513 A1 7/2022

OTHER PUBLICATIONS

PCT/US2022/011496 International Search Report and Written Opinion dated Apr. 7, 2022.

*Primary Examiner* — Badri Narayanan Champakesan
(74) *Attorney, Agent, or Firm* — Wilson Sonsini Goodrich & Rosati (57) ABSTRACT

Observing and/or monitoring a computer network that includes a plurality of nodes may involve detecting one or more data flows, or communications, between two or more nodes of the computer network. The data flow(s) may be associated with a user of the computer network. The user may be an individual person, an entity, and/or a software application. A characteristic of the data flow and the user may be determined and these characteristics may be used to determine a level of security risk caused by the data flow in the network. Then, when the level of security risk is above a risk threshold, an alert may be communicated to an operator of the computer network. The alert may be, for example, a message (e.g., email, SMS text message, etc.) and/or display of an icon, or an aspect (e.g., size, color, and/or location) of an icon provided on a graphical user interface (GUI).

11 Claims, 8 Drawing Sheets

Related U.S. Application Data (60) Provisional application No. 63/134,545, filed on Jan. 6, 2021.

(52) U.S. Cl.
CPC ...... *H04L 63/1416* (2013.01); *H04L 63/1425* (2013.01); *H04L 63/20* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 8,726,376 | B2* | 5/2014 | Rieschick | H04W 12/128 |
| | | | | 705/52 |
| 9,311,476 | B2* | 4/2016 | Stolfo | H04L 63/1408 |
| 9,787,581 | B2* | 10/2017 | Dosovitsky | H04L 45/38 |
| 10,904,277 | B1* | 1/2021 | Sharifi Mehr | H04L 63/1425 |
| 2013/0305357 | A1* | 11/2013 | Ayyagari | H04L 41/069 |
| | | | | 726/22 |
| 2015/0254158 | A1 | 9/2015 | Puri et al. | |
| 2017/0163674 | A1* | 6/2017 | Yu | H04L 63/1425 |
| 2018/0227322 | A1 | 8/2018 | Luo et al. | |
| 2018/0248902 | A1 | 8/2018 | Dnil-Dumitrescu et al. | |
| 2018/0359172 | A1 | 12/2018 | Yadav | |
| 2019/0171169 | A1 | 6/2019 | Di Pietro et al. | |
| 2019/0253443 | A1* | 8/2019 | Vasudevan | H04L 67/12 |
| 2019/0260787 | A1* | 8/2019 | Zou | H04L 41/142 |
| 2019/0342311 | A1 | 11/2019 | Muddu et al. | |
| 2020/0186547 | A1 | 6/2020 | Bartos et al. | |
| 2021/0084073 | A1* | 3/2021 | Crabtree | G06F 16/2477 |
| 2021/0258305 | A1* | 8/2021 | Crabtree | H04L 63/0861 |

\* cited by examiner

SYSTEMS, DEVICES, AND METHODS FOR OBSERVING AND/OR SECURING DATA ACCESS TO A COMPUTER NETWORK

RELATED APPLICATION

This application is Continuation of International Application Number PCT/US2022/011496 filed Jan. 6, 2022 which is an International Application of U.S. Provisional Patent Application Ser. No. 63/134,545, filed Jan. 6, 2021 entitled "SYSTEMS, DEVICES, AND METHODS FOR SECURING DATA ACCESS ON A COMPUTER NETWORK", which is incorporated herein by reference, in their entirety.

FIELD OF INVENTION

The present invention relates to monitoring activity on the computer network and, more particularly, observing activity occurring on and/or within a computer network, monitoring data flows between nodes of the computer networks, and/or securing data accesses in the computer network, so that, for example, network integrity and data privacy may be preserved.

BACKGROUND

Computer networks that include a plurality of nodes (e.g., data sources, software applications, etc.) have security weaknesses and inefficiencies that make them prone to malicious attacks and/or insecure use. As computer networks become larger and more regionally disperse it has become more difficult to monitor them and detect malicious attacks and insecure use of computer network resources.

SUMMARY

The systems, devices, and methods disclosed herein provide, among other things an ability to observe data flow in a computer network, a software application and/or underlying systems and/or processes for the computer network, software applications, and/or users accessing the data flow and/or computer network. Additionally, or alternatively, the systems, devices, and methods disclosed herein provide a manner in which enterprises and/or individuals may comply with various data security regulations and manage that compliance. Additionally, or alternatively, the systems, devices, and methods disclosed herein provide for enhanced protection of data stored on and/or flowing through a computer network, which may prevent inadvertent data leakage, security breaches, and/or violation of computer network usage policies.

Methods for observing and/or monitoring a computer network that may include a plurality of nodes may be performed by, for example, a computer monitoring and/or observing system that detects a data flow between two or more nodes of the computer network. The data flow may be associated with a user of the computer network. Exemplary users include, but are not limited to, individuals, groups of users, businesses, governmental entities, enterprises, software applications, and Web crawlers.

A characteristic of the data flow and a characteristic of the user may then be determined. Exemplary data flow characteristics include, but are not limited to, an identifier for one or more nodes the data has flowed through, a type of node the data has flowed through, a data type (e.g., general data, advertising, search results, personally identifying data, financial data, data classified as high risk, etc.), a size of the data included in the data flow, a source identifier, and/or a destination identifier. Exemplary user characteristics include, but are not limited to, identifiers, permissions, data access rights, subscriptions, and passwords associated with the user. In some cases, the data flow may be detected and/or a characteristic thereof may be identified by using, for example, a user name, a user identifier, a uniform resource locator (URL), a service sequence, a data source, an Internet protocol (IP) address, and a node identifier.

A level of security risk caused by the data flow may then be determined responsively to the determined characteristic(s) of the data flow and the user. When the level of security risk is above a risk threshold, an alert may be communicated to an operator, or administrator, of the computer network and/or computer monitoring and/or observing system. In some instances, the alert is communicated to the operator via a graphical user interface (GUI) showing the nodes of the computer network. Additionally, or alternatively, characteristics of each node may be determined and these characteristics of the sequence of nodes may be considered when determining the level of security risk caused by the data flow. Additionally, or alternatively, a characteristic of a data source for the data flow may be determined and classification of the data flow may further incorporate the characteristic of the data source.

Additionally, or alternatively, in some embodiments, a remedial action may also be executed by, for example, a computer monitoring and/or observing system responsively to a determination that the level of security risk is above the risk threshold. Exemplary remedial action(s) include terminating the user's access to any of the nodes in the path of the data flow, redacting and/or masking of data provided and/or returned to a user, displaying an error message, and/or providing an alert to the operator.

In some embodiments, a trace log for the computer network may be received. The trace log may be generated when, for example, the operator executes a tracing process through all, or a portion, of the computer network. Data from the trace log may be sampled and/or analyzed to create a plurality of trace log samples and, at times, the classifying of the data flow further incorporates the plurality of trace log samples. In some instances, a frequency of the trace sampling is responsive to a sensitivity of the data included in the data flow so that, for example, data and/or data flows associated with higher security risk may be sampled more often and/or a size of the samples may be larger when compared with sampling frequency and/or sample size for data and/or data flows associated with a relatively lower security risk. In some cases, an analysis of the trace log samples may include performing predictive path progress analysis.

In some embodiments, a software application transaction log for the computer network may be recorded and/or received. Data from the software application transaction log may be sampled and/or analyzed to, for example, create a plurality of software application transaction log samples and, in some cases, classification of the data flow may further use the plurality of software application transaction log samples and/or analysis. In some instances, a frequency of the software application transaction log sampling and a size of the samples may be responsive to a sensitivity of the data included in the data flow, a node through which the data flowed, and/or user. In some cases, analysis of the software application transaction log samples may include performing predictive path progress analysis.

In another embodiment, a data flow between a sequence of nodes of the computer network may be detected. The data flow may be detected, sampled, traced, and/or analyzed by using, for example, a user name, a user identifier, a uniform resource locator (URL), a service sequence, a data source, an Internet protocol (IP) address, and a node identifier. The data flow may be associated with a data source and/or a user. The data flow may be sampled to, for example, create a plurality of data flow samples.

The data flow samples may be used to classify the data flow and an indication of the classification may be communicated to an operator of the computer network. In some cases, the classification of the data flow may be determined using a characteristic of the data source.

In some embodiments, a trace log for the computer network may be received and/or generated and data from the trace log analyzed and/or sampled to create a plurality of trace log samples, and classification of the data flow may be further based upon analysis the plurality of trace log samples. In some cases, a frequency of the trace sampling and/or size of the samples may be responsive to a sensitivity of, for example, the data included in the data flow, a node associated with the data flow, a software application associated with the data flow, and/or a user associated with the data flow. In some cases, analysis of the trace log and/or trace log samples may include performing predictive path progress analysis.

In some embodiments, a software application transaction log for the computer network may be received. Data from the software application may be sampled to, for example, create a usage log to create a plurality of software application transaction log samples, wherein the classifying of the data flow further uses the plurality of software application transaction log samples. At times, a frequency of the software application transaction log sampling and/or a size of the samples may be responsive to a sensitivity of the data included in the data flow and/or a sensitivity of a user, software application, and/or node associated with the data flow. In some cases, analysis of software application transaction log samples may include performing predictive path progress analysis.

In another embodiment, a software application transaction log may be received from, for example, a software application (e.g., a data tracing program) running on, within, and/or outside the computer network. A data source transaction log may be received from a data source communicatively coupled to the computer network and the software application transaction log and the data source transaction log may be compared with one another to, for example, identify differences therebetween such as a data source transaction that does not have a corresponding software application transaction log entry, and/or a software application transaction log entry that does not have a corresponding data source transaction log entry. The differences may then be flagged, or otherwise identified as a transaction that may warrant further analysis, and an indication of the identified data source transaction log entry that does not have a corresponding software application transaction log entry and/or software application transaction log entry that does not have a corresponding data source transaction log entry. Additionally, or alternatively, an operation of one or more of the software applications and/or data sources associated with the software application transaction logs and/or data source transaction logs, respectively, may be modified or updated and/or a modification and/or updating of an operation of the software applications and/or data sources may be recommended responsively to a result of the comparison of the software application transaction log and the data source transaction log. In some cases, the modification of an operation of the data source and/or the software application may include one or more of turning it off, limiting permissions, limiting access, expanding access, and/or expanding permissions. In some instances, an indication of the proposed and/or executed modification and/or updating of the of one or more of the software applications and/or data sources may be provided to the operator.

Additionally, or alternatively, an operation of the computer network and/or a node therein associated with the software application transaction logs and/or data source transaction logs may be modified or updated and/or a modification and/or updating of an operation of the computer network may be recommended responsively to a result of the comparison of the software application transaction log and the data source transaction log. In some cases, the modification of an operation of the computer network may include one or more of redirecting traffic and/or data flows within the computer network, isolating one or more nodes operating on the computer network, denying permissions and/or access to a software application, data source, and/or user, and/or expanding access to a software application, data source, and/or user. In some instances, an indication of the proposed and/or executed modification and/or updating of the of one or more of the software applications and/or data sources may be provided to the operator.

In some embodiments, a set (e.g., 2-10,000) of software application transaction logs and a set (e.g., 2-10,000) of data source transaction logs may be received. The set(s) of software application transaction logs and/or data source transaction logs may then be aggregated and/or organized into an aggregated and/or organized set of software application logs that are compatible with an aggregated and/or organized set of data source transaction logs and vice versa. In some instances, the aggregating and organizing of the set of software application transaction logs and/or the set of data source transaction logs may include decrypting, reformatting, and/or decoding content of the at least one of the set of software application transaction logs and the set of data source transaction logs so that, for example, they are compatible and/or to facilitate comparison and/or analysis of the software application transaction logs and/or the set of data source transaction logs.

At times, the data source transaction log may be received responsively to a request for the data source transaction log communicated by the computer monitoring and/or observing system to, for example, the data source and/or a node associated with a data transaction and/or data flow.

In some embodiments, a rule regarding, for example, the flow of data within the computer network may be prepared, generated, and/or modified responsively to the comparing of the software application transaction log and the data source transaction log. In some cases, an indication of the rule may be provided to the operator. Additionally, or alternatively, the rule may be implemented and/or executed within the computer network.

In some embodiments, observing and/or monitoring a computer network including a plurality of nodes may include receiving a set (e.g., 2-10,000) of software application transaction logs directly and/or indirectly from, for example, one or more software applications running on and/or within the computer network. In some cases, each software transaction log may be received from a separate software application. In other cases, multiple software transaction logs may be received from a single software application. In addition, a set of data source transaction logs may be received directly and/or indirectly from one or more data source(s) associated with the computer network. In some cases, each data source transaction log may be received from a separate data source application. In other cases, multiple data source transaction logs may be received from a data source.

The set of software application transaction logs and the set of data source transaction logs may be compared with one another to determine differences therebetween. Any data source transaction log entry that does not have a corresponding software application transaction log entry and/or any software application transaction log entry that does not have a corresponding data source transaction log entry may be flagged or otherwise associated with an alert condition. An indication of a flagged data source transaction log entry, software transaction log entry, and/or alert condition may then be communicated to an operator via, for example, a message and/or an icon displayed on a GUI or map of nodes included in the computer network.

At times, a trend analysis may be performed on the software application transaction logs and/or data transaction logs and an indication of a result of the trend analysis may be communicated to the operator.

In some embodiments, a security sensitivity of one or more of the software applications associated with the software application transaction logs may be determined and an indication of a result of a security sensitivity determination for the one or more data sources may be communicated to the operator.

In some cases, a trend analysis on the data source transaction logs may be performed and an indication of a result of the trend analysis may be communicated to the operator.

Additionally, or alternatively, a security sensitivity of one or more of the data sources associated with the data transaction logs may be determined and an indication of a result of a security sensitivity determination for the one or more data sources may be communicated to the operator.

In some embodiments, one or more distributed tracing programs and/or applications may be executed within the computer network, wherein a result of executing the distributed tracing programs and/or applications may be trace log generation. Then, the data source transaction log and/or software transaction log may then be compared with one or more trace logs and any data source transaction log entry and/or software transaction log entry that does not have a corresponding trace log entry may be flagged and/or generate an alert, which may be communicated to the operator. In some instances, a trace log may be sampled and a security sensitivity of traces, or trace log entries, included within a sample of the trace log and an indication of a result of a security sensitivity determination for the trace log sample may be communicated to the operator via, for example a message and/or icon or graphic element provided on a GUI. In some cases, determining the security sensitivity of the trace log entries and/or samples include execution of predictive path progress analysis.

Additionally, or alternatively, a data flow within the computer network may be sampled and a security sensitivity of the sampled data flow may be determined and communicated to the operator. The security sensitivity of the sample data flow may be determined via, for example, execution of predictive path progress analysis.

In some embodiments, a user behavior analysis program may be executed on, for example, the data transaction logs, the software application transaction logs, and/or the trace logs and a reference model for data flows within the computer network may be created using a result of the user behavior analysis. An indication of a data flow corresponding to data flowing between a sequence of nodes of the computer network may be received and analyzed using the reference model. A result of the analysis of the indication of the data flow may be communicated to the operator. In some instances, the reference model may model authorized user behavior in compliance with one or more policies of the computer network and the result of the analysis of the indication of the data flow is an indication of whether a user associated with the data flow is authorized to access data included within the data flow. Additionally, or alternatively, the reference model may model an authorized data access pattern and the result of the analysis of the indication of the data flow is an indication of whether a data access pattern of the data flow may be an authorized data access pattern. In some cases, a risk severity indicator for the reference model may be determined and analysis of the indication of the data flow using the reference model may employ the risk severity indicator for the reference model.

In some embodiments, a policy and/or rule for communication between nodes in the computer network may be generated and/or modified responsively to a result of the analysis of the indication of the data flow and the policy may be provided to the operator.

In some cases the data source transaction logs, software transaction logs, and/or trace logs may include enterprise information.

BRIEF DESCRIPTION OF DRAWINGS

The present invention is illustrated by way of example, and not limitation, in the figures of the accompanying drawings in which.

WRITTEN DESCRIPTION

Effectively observing activity within and/or monitoring an information technology environment such as a distributed computer network, nodes within the computer network, and/or flows of data in the computer network is often performed to, for example, monitor data governance, monitor compliance with various policies and laws, detect cybersecurity threats, and/or detect data or network security breaches using traditional technology is often difficult due to, for example, gaps in visibility into data flows into, out of, and within the computer network. The importance of understanding what data stored in or associated with a computer network is being accessed and who is accessing it is compounded when that computer network stores, or is otherwise associated with sensitive and/or private data such as personally identifying information and/or sensitive business information such as trade secrets or financial information. Failure to detect misuse of computer network resources and/or a data or security breach of those resources can result serious consequences for computer network operators, owners, and enterprises and/or individuals who use and/or store information on the computer network.

Traditional tools for monitoring a computer network such as service logs or data source logs do not close these network visibility gaps because they fail to provide an overall context of the user, data being accessed, and data access flow within the computer network. In particular, using traditional means, it may be difficult to inventory data sources that are operating in and/or are associated with a computer network. It may further be difficult to determine a security level for data sorted in data sources and what types of policies for data governance are required for mitigating risk for inappropriate use of the data. These visibility gaps make it difficult to determine who has access to different data sources within the computer network and what can they do with access.

Traditional computer monitoring also fails to provide for reliable ways to monitor use and/or access of sensitive data and where it resides within the computer network. Furthermore, traditional computer monitoring does not effectively, or accurately, determine whether various software applications and data storage and/or cleansing policies (e.g. extract transform load (ETL)) operating on and/or within the computer network are compliant with internal and/or external (e.g., governmental) policies and/or regulations.

The present invention solves these problems, and others, by providing a detailed and comprehensive view into what data is stored on and/or associated with a computer network regardless of a complexity and/or degree of distribution of the computer network and also a security/privacy sensitivity, or risk, associated with the data as well as who is accessing the data and how they are accessing it. The present invention provides these solutions by, for example, facilitating the tracking of data access for some, most, or all data sources, software applications, and/or users in and/or associated with the computer network.

Additionally, or alternatively, the present invention solves the problem of accurately monitoring a computer network by discovering and/or determining, for example, an identity and/or level of security risk for data sources, service users, software application users, and/or data source users by analyzing (e.g., compare and/or correlate the logs with one another to determine discrepancies therebetween) software application transaction logs, data source logs, and/or trace logs recording communication into, out of, and/or within the computer network to, for example, identify potential problems with users accessing the computer network and/or data flows into, out of, and/or within the computer network that may be indicative of, for example, a data use policy violation and/or an attempted and/or actual security breache of the computer network. Additionally, or alternatively, the present invention solves the problem of accurately monitoring a computer network by recommending and/or implementing one or more remedial actions (e.g., denial of access and/or re-routing of data flows) to resolve an identified potential problem and/or mitigate a security risk.

At times, results of the analysis are provided to a user as a graphical user interface (GUI) that includes a visual, or data security, map of the computer network showing, for example, nodes, users, application/micro-service nodes, data sources, and/or how the data is flowing between them. In some cases, the data security map may also display security sensitivities for computer network resources (e.g., nodes) thereby providing comprehensive visibility of data accesses into, out of, and within the computer network.

In addition, determining an identity of who is accessing the data and/or a data source associated with a computer networks and, in particular a distributed computer network is problematic, if not impossible, due to (among other things) the variety of ways in which a user may access data in the traditional computer networks that intentionally, or unintentionally, mask their identity. For example, users may access data in a computer network through the use of, among other things, a common data source service account, back-office applications, native tools, distributed applications, and/or micro-services all of which make it difficult to determine a true identify of who is accessing what data associated with a computer network, how they are be accessing it, and why. These visibility gaps create situations in which there may be no way to monitor and/or determine whether a user unauthorized to access data and/or if a data access poses any risk of, for example, a security and/or privacy breach. Furthermore, traditional computer network monitoring processes and products do not have enough real-time and/or historical context for activity inside and/or outside computer networks to identify and/or differentiate between harmful and/or unauthorized and non-harmful and/or authorized data access patterns and/or user behavior patterns. Thus, these traditional computer network monitoring processes and products fail to provide and/or utilize contextual information regarding computer network use to accurately and expediently identify unauthorized computer network usage, potential data security breaches, and/or network access risks.

The present invention addresses these concerns by, for example, examining historical (e.g., seconds, minutes, hours, days, weeks, months ago) contextual information regarding computer network usage to look for and/or learn expected, authorized, unexpected, unauthorized, and/or risky computer network usage patterns. This contextual information may take the form of software application transaction logs, data source transaction logs, and trace logs for data flows and/or transactions conducted in and/or associated with the computer network. Then, current computer network usage may be analyzed by comparing real-time, or current software application transaction logs, data source transaction logs, and trace logs for data flows and/or transactions conducted in and/or associated with the computer network with the historical contextual information and/or expected, authorized, unexpected, unauthorized, and/or risky computer network usage patterns determined therefrom to determine whether, for example, current, or real-time computer network usage is expected, authorized, unexpected, unauthorized, and/or risky. When expected, authorized, unexpected, unauthorized, and/or risky use of computer network resources is detected and/or identified, a computer network operator may be actively and/or passively notified and/or one or more remedial actions (e.g., denial of access and/or re-routing of computer network traffic) may be executed in accordance with, for example, one or more computer network usage and/or data protection policies that, in some cases, may be customizable by an operator and/or administrator of the computer network.

Additionally, or alternatively at times, enterprises are required to comply with various governmental compliance standards for data security and privacy (e.g., European General Data Protection Regulation (GDPR), California Consumer Privacy Act (CCPA), Payment Card Industry Data Security Standard (PCI DSS), Health Insurance Portability and Accountability Act (HIPAA), etc.) and not complying with these standards may result in an imposition of, for example, governmental action (e.g., sanctions, injunctions, fines, and/or lawsuits) and/or a loss of reputation and/or goodwill with customers and/or the general public. While some independent tools exist to classify data in known data sources, it remains difficult, using traditional methods, to accurately and quickly discover data sources present in a computer network in a comprehensive way and how these data sources are being accessed to, for example, prepare required compliance reports, especially when users employ various applications/micro-services to access the communication network while keeping their true identity hidden. The present invention allows for compliance with these standards by identifying service and data source users, discovering and deep classifying the data based on the specific standard (CCPA, GDPR, PCI DSS, HIPAA, etc.), tracking the data accesses are proper, providing alerts when unauthorized, or suspicious, use is discovered, taking remedial action when unauthorized, or suspicious, use is discovered, and providing the compliance standard specific reports.

Figure 1:
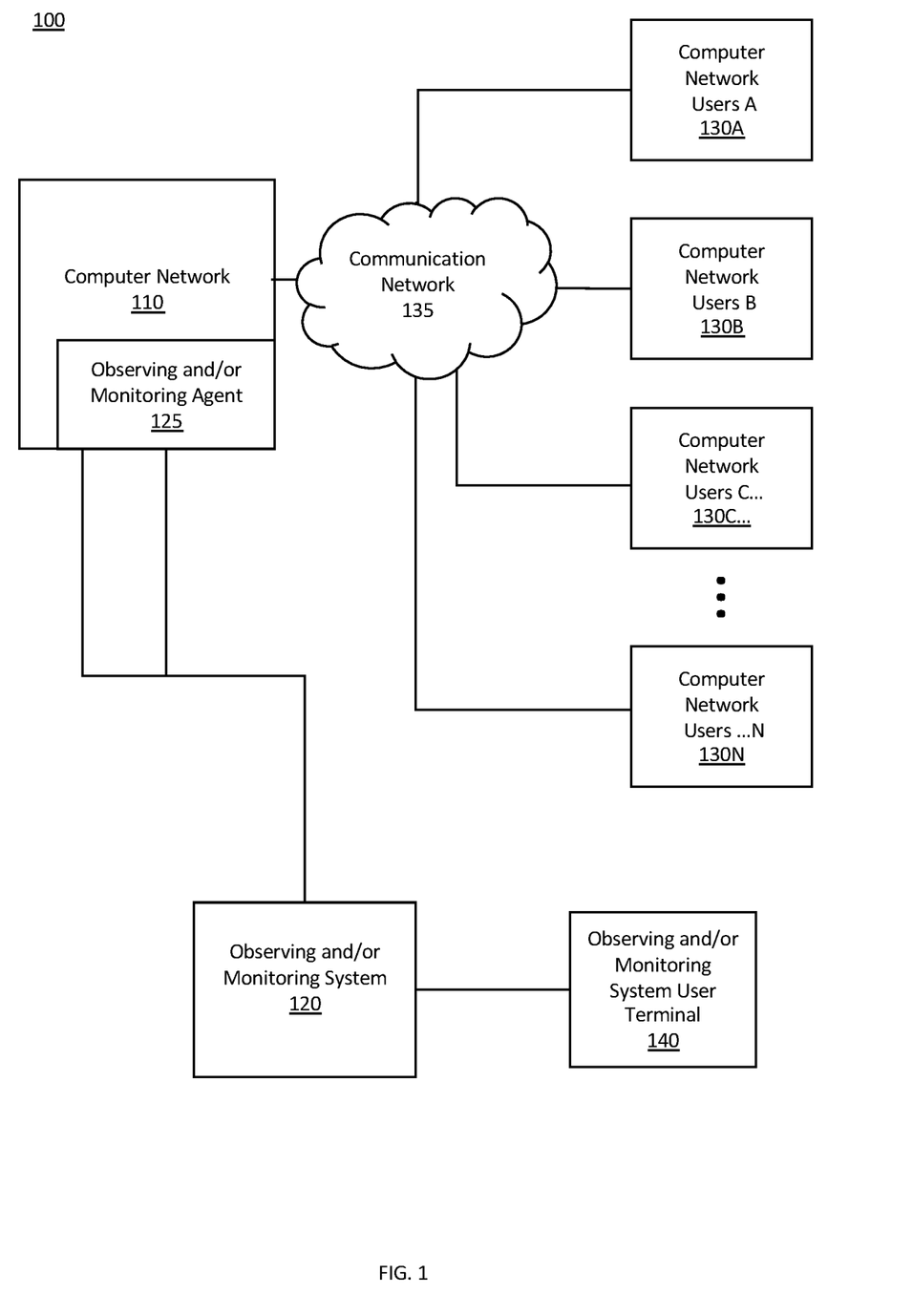
FIG. 1 is a block diagram of an exemplary system for observing and/or monitoring activity on a computer network, in accordance with some embodiments of the present invention.

FIG. 1 is a block diagram of an exemplary system 100 for observing and/or monitoring activity on a computer network that may be configured to execute one or more processes herein. System 100 includes a computer network 110, that includes an observing and/or monitoring agent 125 installed thereon and/or therein, a monitoring and/or observing system 120, a plurality of computer network users 130A-130N connected via a computer network 135, and a monitoring and/or observing system user terminal 140. Computer network 110 may be a computer network owned, operated, and/or used by one or more entities (e.g., businesses, corporations, enterprises, governmental agencies, and/or individual people). Computer network 110 may include various pieces of hardware such as servers and/or processors that are configured to execute one or more services for an operator of computer network 110 and/or one or more of the computer network users A-N 130A-130N. Additionally, or alternatively, computer network 110 may include software that is configured to be and/or support servers, databases, and other software. In some embodiments, computer network 110 may include and/or may be communicatively coupled (via, for example computer network 135) to one or more cloud computing services and/or external, or third party, service providers such as providers of, for example, web hosting, e-commerce, banking, cyber security, database management services via, for example, hardware resident in computer network 110, software applications running on one or more components of computer network 110, and/or data stored on computer network 110.

Computer network users A-N 130A-130N may be any user of computer network 110. In some cases, different individual computer network users A-N 130 A-N may be provided with different levels of access to computer network 110 and/or services and/or operations performed by computer network 110. The different levels of access to computer network 110 may be facilitated by any appropriate security protocol (e.g., username and password; biometric information, etc.).

Monitoring and/or observing system 120 may include hardware (e.g., proxy servers, network taps, etc.) and observing and/or monitoring agent 125 may include agents and/or other computer software applications communicatively coupled to computer network 110, monitoring and/or observing system 120, or components thereof configured to execute one or more processes described herein and/or provide information for the execution of one or more processes described herein. Monitoring and/or observing system user terminal 140 may be any computer-based system configured to communicate with one or more components of system 100 and provide/receive information from a user of system 100 through monitoring and/or observing system 120. Often times, monitoring and/or observing system user terminal 140 includes a processor, a display device, a user interface (e.g., keyboard, trackpad, and/or touch screen display), and wired and/or wireless communication port(s). Exemplary users of system 100, monitoring and/or observing system 120, and/or observing and/or monitoring agent 125 are DevOps users or information technology professionals who are monitoring usage of computer network 110.

Figure 2:
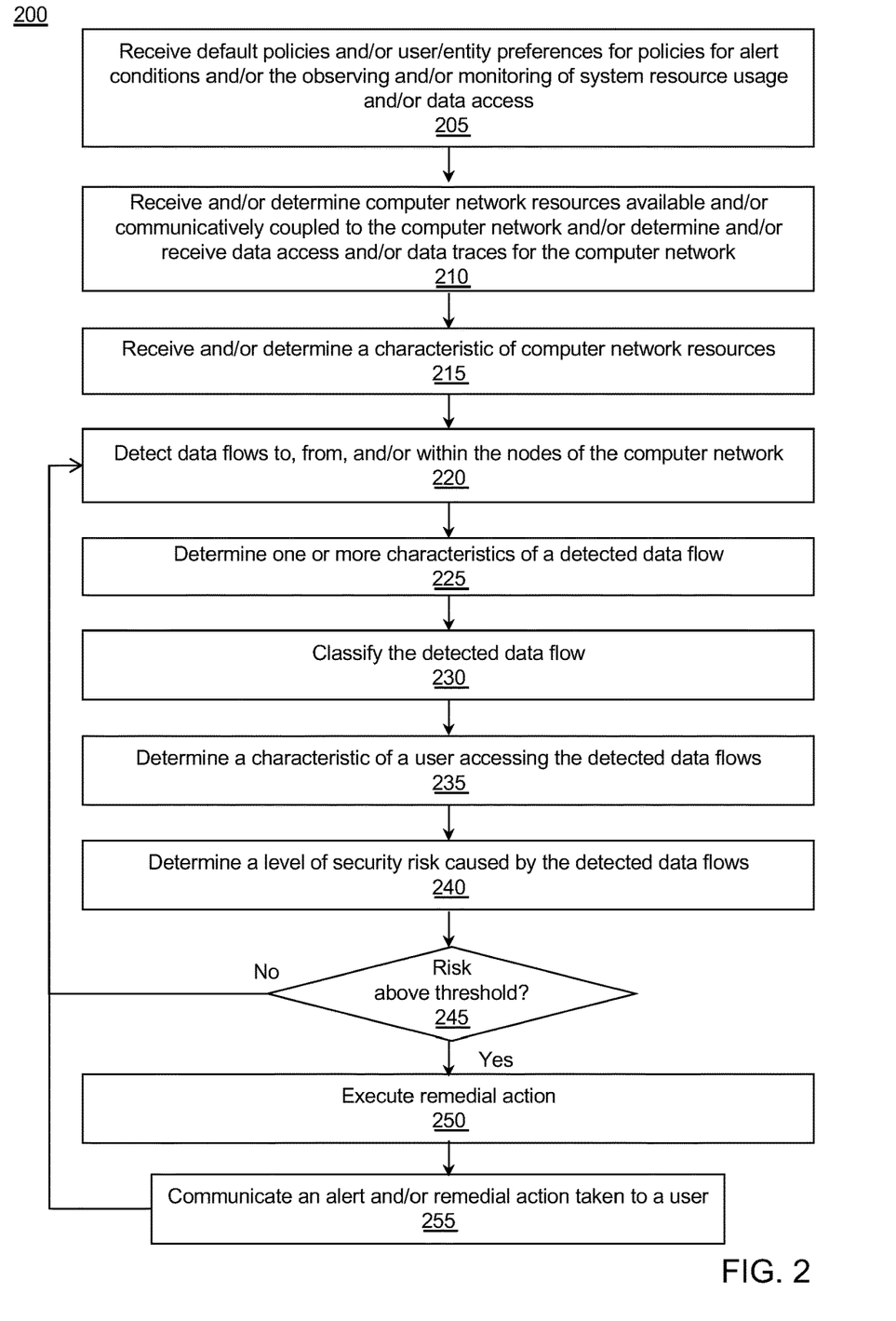
FIG. 2 provides a flowchart illustrating a process for observing and/or monitoring activity on a computer network, in accordance with some embodiments of the present invention.

FIG. 2 provides a flowchart illustrating a process 200 for observing and/or monitoring activity on a computer network. Process 200 may be executed by, for example, system 100 and/or components thereof such as monitoring and/or observing system 120 and/or observing and/or monitoring agent 125.

In step of 205, policies, data flow rules, and/or data flow aggregation rules and/or user/entity preferences for policies, data flow rules, and/or data flow aggregation rules for the observation and/or monitoring of a computer network may be received. The policies, data flow rules, and/or data flow aggregation rules may inform, for example, how and/or what computer network resources are observed and/or monitored and/or how and/or what alert conditions/thresholds are set. In some embodiments, the policies, data flow rules, and/or data flow aggregation rules are default policies, data flow rules, and/or data flow aggregation rules. Additionally, or alternatively, the policies, data flow rules, and/or data flow aggregation rules may be tailored for a particular entity type such as a financial entity (e.g., a bank or mutual fund manager), a healthcare provider (e.g., hospital or health insurance company), a school, or an employer so that the policies, data flow rules, and/or data flow aggregation rules set for monitoring of the network are compliant with one or more laws, rules, or regulations (e.g., federal, state, or local laws, industry-standard practices, etc.) for the type of entity using monitoring and/or observing system 120 and/or observing and/or monitoring agent 125. At times, the policies, data flow rules, and/or data flow aggregation rules (default or otherwise) may include policies, data flow rules, and/or data flow aggregation rules compliant with one or laws such as data security and/or privacy laws; examples of which include, but are not limited to, GDPR, CCPA, PCI DSS, HIPAA, tax laws, employment laws, and so on.

In some embodiments, the default policies, data flow rules, and/or data flow aggregation rules may include recommendations (which may be developed by a recommendation engine included in, for example, monitoring and/or observing system 120 and/or observing and/or monitoring agent 125). Exemplary recommendations, rules, and/or policies include, but are not limited to, recommending that HTTPS be used responsively to a determination that HTTP is being used in/by a software application running on the computer. In another example, communication within the data network may be scanned for cross-site scripting issues and a recommendation may be made that may address and/or remediate the cross-site scripting issues. Additionally, or alternatively, security tokens, passwords, and/or user names may be tested to determine their strength and when a password is determined to be weak from a security standpoint, alternative password policy and/or rule may be suggested. Additionally, or alternatively, creation of a back-office software application may be recommended when, for example, direct database access is happening at a frequency that may generate too many alerts and/or false positive alerts. Additionally, or alternatively, a recommendation to limit access to a database and/or type of data may be made when, for example, too many users are accessing it directly. Additionally, or alternatively, when database access statements and/or requests combine a request for sensitive and insensitive data, a code to differentiate between sensitive and insensitive data may be recommended. Additionally, or alternatively, data access requests may be scanned for SQL injections and other types of insecure/inefficient queries and a recommendation to require more secure or efficient queries from the application code and/or users may be provided.

In step 210, an indication (e.g., name, type, IP address, etc.) or count of one or more resources (e.g., servers, databases, processors, cloud computing devices or services, devices running third party software, software applications, etc.) within and/or communicatively coupled to a monitored computer network, such as computer network 110 may be received (e.g., from monitoring and/or observing system user terminal 140) and/or determined by, for example, monitoring and/or observing system 120 and/or observing and/or monitoring agent 125. Additionally, or alternatively, data flows, accesses, and/or data traces for the entity and/or computer network may be received and/or determined in step 210.

In step 215 one or more characteristics of the computer network resources and/or operations performed on the computer network (e.g., software applications, networks, data stored in the data sources, data accesses, and/or data traces) may be received and/or determined. In some cases, execution of step 215 may include determining a type of resource (e.g., server, database, etc.), size of the resource (e.g., a storage capacity of a database), processing power for a resource, and/or a typical usage of a resource (e.g., how often the resource is accessed under one or more conditions (e.g., time of day, type of resources, etc.), typical use cases for the resource, etc.).

In step 220, data flows to, from, and/or within the computer network may be detected and one or more characteristics thereof may be determined. A data flow may be data moving from one node to another within the computer network and/or from one node within the computer network to a node outside the computer network (e.g., a computer network user A-N 130A-130N and/or a third-party web server). Exemplary data flows are shown on the data flow maps of FIGS. 5A, 5B, and 5C as will be discussed below.

In some cases, the data flows may be actual data flows indicating how data moves within a computer network. Additionally, or alternatively, the data flows may be modeled data flows that predict how data may move within a computer network. For example, if the entity is retail store with an e-commerce website, modeled data flows may include expected ways modeled users (which may be modeled upon computer network users A-N 130A-130N using, for example,) of the e-commerce website may shop for and purchase items from the website and actual data flows may include actual ways users (e.g., computer network users A-N 130A-130N) of the e-commerce website shopped on the website and made purchases therefrom.

In step 225, one or more characteristics of the detected data flows may be determined. Exemplary characteristics include, but are not limited to, a level of sensitivity for the data in a data flow, a volume of data in a data flow, a volume of a particular type of data flow, nodes the data is flowing between within the computer network, requests for data flows, and the like. An example of how one or more characteristics of data within a data flow may be determined is provided by FIG. 3, which depicts a flowchart for a process 300 for determining a characteristic of data within a data flow, and the associated discussion.

In step of 230, the detected data flow may be classified and/or aggregated with other data flows that share, for example, one or more common characteristics. The data flow may be classified according to, for example, one or more policies, a level of sensitivity for the data being accessed, data flow rules, and/or data flow aggregation rules that may be default policies, data flow rules, and/or data flow aggregation rules and/or policies, data flow rules, and/or data flow aggregation rules specific to a monitoring and/or observing system user, such as monitoring and/or observing system user terminal 140.

In step 235, a characteristic of a user triggering the data flow and/or accessing data and/or resources within the computer network may be determined. Further information regarding how this determination may be made is provided in FIG. 4, which is a flowchart of a process 400 for determining one or more characteristics of a user who is accessing data and/or resources within the computer network, and the associated discussion. In some embodiments, execution of step(s) 225 and/or 235 may include execution of one or more steps (e.g., step(s) 420, 422, and/or 424) of process 400, which is described below with regard to FIG. 4 and/or comparison of a data flow to a reference and/or modeled data flow to determine differences and/or deviations therebetween.

In step 240, a level of security risk caused by the detected data flow and/or aggregated detected data flows may be determined. The level of security risk may be determined and/or marked using any appropriate scale (e.g., 1-100, high, medium, and low) based on the determinations of step 225, 230, 235 and/or the reference model computed in the step 426 in FIG. 4. Additionally, or alternatively, in some embodiments, the level of security risk may be determined using one or more policies, data flow rules, and/or data flow aggregation rules which may be a default policies, data flow rules, and/or data flow aggregation rules; and/or policies, data flow rules, and/or data flow aggregation rules specific to a monitoring and/or observing system user, such as a user of monitoring and/or observing system user terminal 140.

Next, in step 245, it may be determined whether the security risk is above a threshold and, if not, process 200 may proceed to step 220 so that data flows may be consistently and/or periodically observed and/or monitored over time. In some embodiments, when the security risk is above the threshold, a remedial action may be executed (step 250). The remedial action executed in step 250 may be dependent upon one or more policies, data flow rules, data flow aggregation rules, and/or preferences that may be received in step 205. In some instances, an alert may be communicated to a monitoring and/or observing system user (step 255) following the determination of step 245 without execution of the remedial action and step 250. Alternatively, or additionally, when step 250 is executed, an indication of the remedial action may be communicated to the monitoring and/or observing system user. In some instances, this communication may also include an alert or warning. Exemplary remedial actions include, but are not limited to, interrupting a data flow, disconnecting a node in the computer network, disconnecting a plurality of nodes within the computer network, disconnecting a computer network user, and/or banning a computer network user from accessing the computer network in the future. In some embodiments, process 200 may conclude following execution of step 255. In other embodiments, process 200 and/or steps thereof may be continuously and/or periodically executed to, for example, observe and/or monitor the computer network over time and/or adjust policies, data flow rules, and/or data flow aggregation rules over time. In some embodiments, the threshold may be automatically adjusted based on machine learning.

In some embodiments, process 200 and/or portions thereof may be repeated a plurality (e.g., hundreds, thousands, millions) of times so that, for example, data may be iteratively analyzed, recognized, and refined to determine, for example, one or more patterns regarding, for example, typical usage of the network, whether different types of data flows are within the expected usage of the computer network, common characteristics of authorized users of the computer network, characteristics of unauthorized users of the computer network, and/or characteristics of authorized and unauthorized use of the computer network. In some cases, path-based anomaly detection, velocity-based anomaly detection, and/or user/entity based behavior analytics may be used to recognize patterns within data use, data access, and/or use of the computer network. At times, this iterative processing and analysis of data flows and traffic on a computer network may assist monitoring and/or observing system 120, observing and/or monitoring agent 125, and/or users of monitoring and/or observing system user terminal 140 with recognizing problems that may arise within the computer network and also to understand an impact of execution of one or more remedial actions to mitigate these problems.

Figure 3:
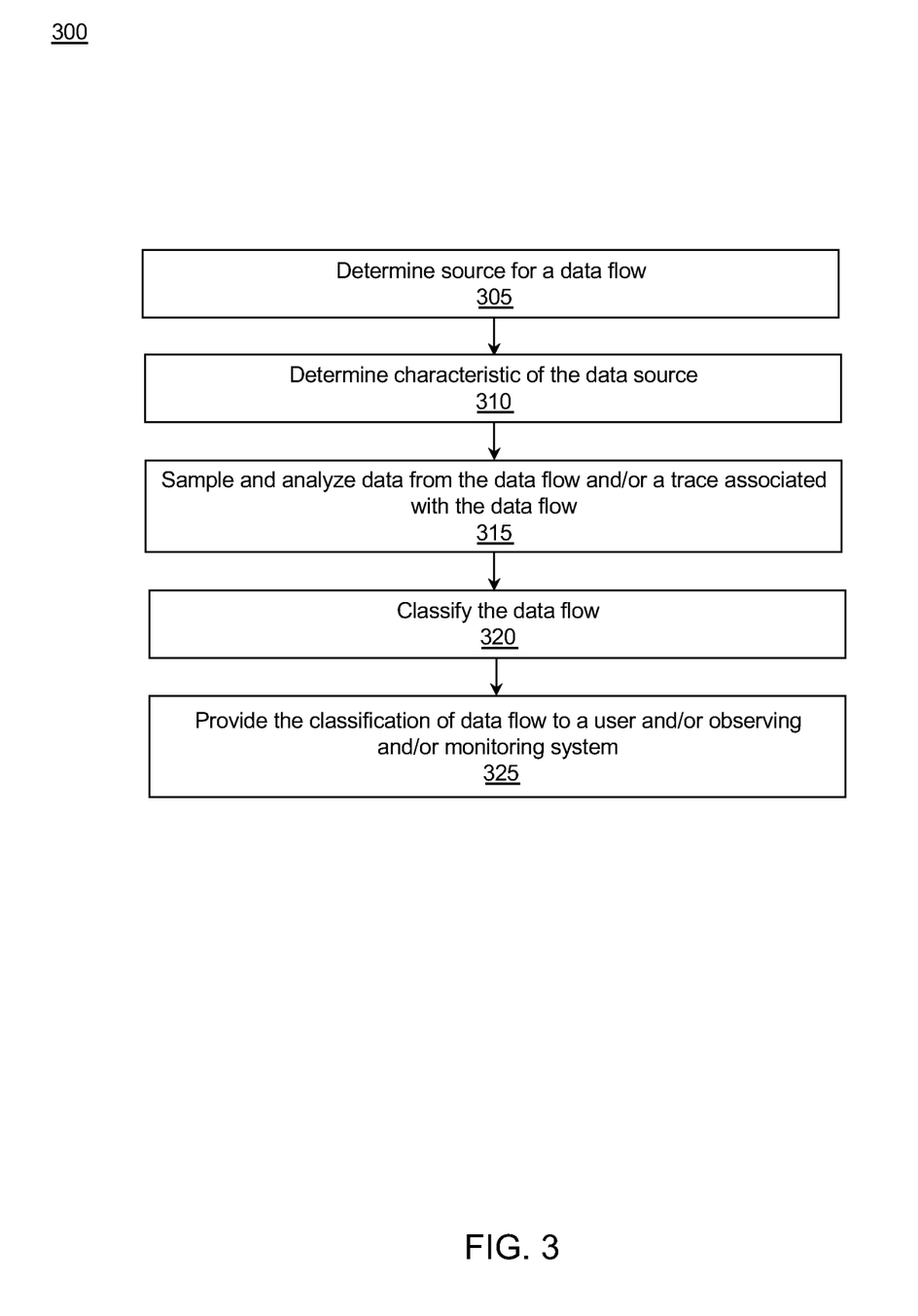
FIG. 3 provides a flowchart illustrating a process for determining the level of sensitivity for data communicated within a computer network, in accordance with some embodiments of the present invention.

FIG. 3 provides a flowchart illustrating a process 300 for determining the level of privacy sensitivity for data communicated within a computer network. In some embodiments, process 300 may be executed as part of process 200 at, for example, step 225, 230, and/or 235. Process 300 may be executed by, for example, system 100, and/or components thereof such as monitoring and/or observing system 120 and/or observing and/or monitoring agent 125.

In step 305, a data source for a flow may be determined. Exemplary data sources include, but are not limited to, hardware and/or software such as databases, processors, servers, file systems, cloud-based software or hardware, file systems, and/or software as a service applications such as SALESFORCE™ and/or SHAREPOINT™ services, included in and/or communicatively coupled to the computer network, computer software running on and/or in communication with the computer network, and/or computer network user identification (e.g., username or IP address) information. In some embodiments, execution of step 305 may include determining one or more nodes within the computer network responsible for providing and/or communicating the data flow within the computer network and/or to a computer network user.

In step of 310, one or more characteristics of the data source may be determined. Exemplary characteristics include, but are not limited to, an address of the data source, the type of data associated with the data source, and/or a sensitivity (e.g., confidential, top secret, private, personally identifiable information, de-identified information, publicly available information, etc.) label associated with the data source. The sensitivity characteristics and/or classifications may pertain to a level of privacy and/or security for the data of a data flow and/or the data source.

In step 315, data from the data flow, data access information (e.g., database query statement and/or database query output), and/or a trace associated with the data flow may be sampled and analyzed so that a characteristic thereof may be determined, and the data flow may be classified (step 320) with, for example, an indicator of data sensitivity for a source of the data in the data flow and/or for the data included in the data flow. For example, if a sampling of the data flow indicates that the data flow includes personally identifiable information, then the data flow may be classified as confidential or highly private data and may be sampled more frequently than data flows that do not include personally identifiable information and/or confidential data. If the sampling of the data flow indicates that the data flow includes information regarding an item for sale on a retail e-commerce site, then the data flow may be classified as not-confidential or publicly available information and may be sampled at a lower frequency than data flows that include confidential data. In some embodiments, steps 315 and/or 320 may be executed by using keyword based heuristics to classify data within the data flow and/or a data source associated with the data flow. In step 325, the classification of the data flow may be provided to a user, such as monitoring and/or observing system user terminal 140, monitoring and/or observing system 120, and/or observing and/or monitoring agent 125 for further processing in line with, for example, process 200.

In some embodiments, execution of step 315 may include directly sampling data from a trace associated with a data flow. Additionally, or alternatively, execution of step 315 may include indirectly sampling data from a data source associated with a data flow. In some embodiments, a rate of sampling may be responsive to one or more factors such as a level of data sensitivity, whether there is a threat condition on the computer network, whether there is something aberrant or unexpected regarding the data flow, a trace, and/or how the computer network is being used. Additionally, or alternatively, one or more features of the data and/or trace sampling may be responsive to a likelihood that the trace may access sensitive data, which may be determined using, for example, a predictive path progress analysis, which in some cases, may be performed using, for example, artificial intelligence and/or machine learning.

Figure 4:
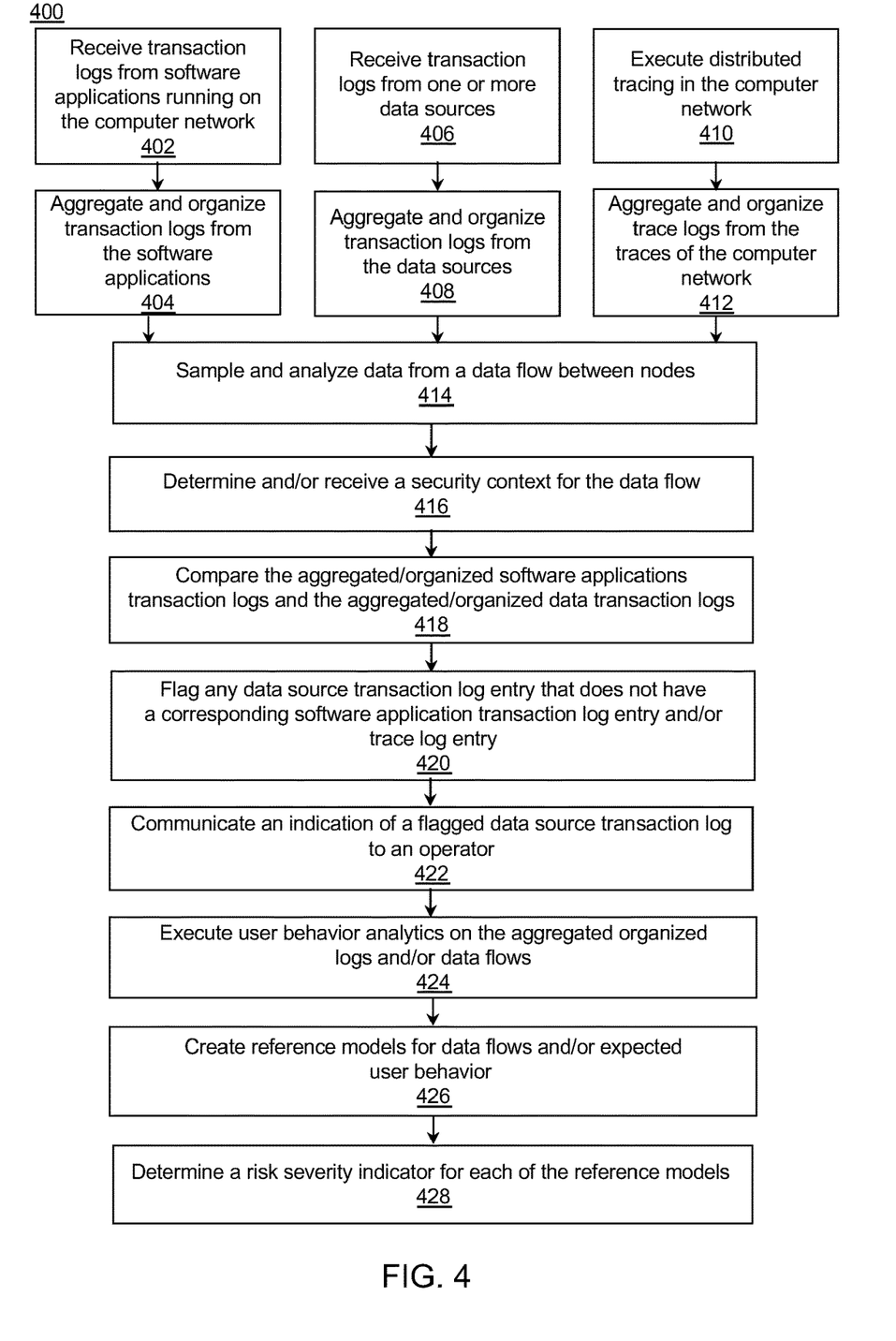
FIG. 4 provides flowcharts illustrating a process for determining a characteristic of data being accessed and/or who is accessing the data, in accordance with some embodiments of the present invention.

FIG. 4 provides a flowchart illustrating a process 400 for flagging activity (e.g., data flows, data accesses, traces of communication through the computer network, etc.) in the computer network that is of concern. Process 400 may be executed to, for example, determine a characteristic of data being accessed and/or who/what is accessing the data and, in some instances, a context for the data access such as time of day, IP address associated with a request for the data, and/or other data accessed and/or requested by the user. In some embodiments, process 400 may be executed as part of process 200 at, for example, step 225, 230, 235, and/or 240. Process 400 may be executed by, for example, system 100 and/or components thereof such as monitoring and/or observing system 120 and/or observing and/or monitoring agent 125.

In step 402, transaction logs from one or more software applications (also referred to herein as "software application transaction logs") running on and/or in communication with the computer network may be received. In step 404, the software application transaction logs may be aggregated and/or organized according to one or more characteristics (e.g., time of day, software type, software function, data sensitivity type, data type, data sources, etc.). A result of execution of step 404 may be reformatting and/or organization of the trace logs so that they may be analyzed and/or compared with, for example, one or more of a software application transaction log(s) and/or trace log(s) during, for example, execution of step 418.

Additionally, or alternatively, transaction logs from one or more data sources running on and/or in communication with the computer network may be received in step 406. In step 408, the logs from the software applications may be aggregated and/or organized according to one or more characteristics (e.g., time of day, software type, software function, data sensitivity type, data type, data sources, etc.). The logs from the data sources may also be aggregated and/organized according to one or more characteristics (e.g., time of day, software type, software function, data sensitivity type, data type, data sources, etc.). A result of execution of step 408 may be reformatting and/or organization of the trace logs so that they may be analyzed and/or compared with, for example, one or more a data source transaction log(s) and/or trace log(s) during, for example, execution of step 418.

Additionally, or alternatively, in step 410, distributed tracing within the computer network may be executed so that resources (e.g., nodes) within and/or communicatively coupled to the computer network as well as data flow routes between the resources may be identified. A result of execution of step 410 may be the generation and/or updated of trace logs of communications within and/or using one or more nodes of the computer network. Additionally, or alternatively, in trace logs may be received in step 410. In some embodiments, a result of executing step 410 may be received in step 205 of process 200.

In step 412, the trace logs may be aggregated and/organized according to one or more characteristics (e.g., time of day, software type, software function, data sensitivity type, data type, data sources, etc.). The trace logs from the data sources may also be aggregated and/organized according to one or more characteristics (e.g., time of day, software type, software function, data sensitivity type, data type, data sources, etc.). A result of execution of step 412 may be reformatting and/or organization of the trace logs so that they may be analyzed and/or compared with, for example, one or more a data source transaction log(s) and/or software application transaction log(s) during, for example, execution of step 418.

Optionally, data from one or more data flows through the computer network may be sampled (step 414) so that, for example, a security context and/or data sensitivity value for the data and/or data flows may be determined (step 416) and/or a characteristic of the data flow may be determined. In some embodiments, execution of step 416 may resemble execution of step 315 as described above with regard to process 300. In step 418, the aggregated and/or organized logs from aggregated and/or organized software application transaction logs, data source transaction logs may be compared with one another to determine whether any software application transaction log entries do not have a corresponding data source transaction log entry and/or whether any data source transaction log entries do not have a corresponding software application transaction log entry. Additionally, or alternatively, execution of step 418 may also include comparison of aggregated/organized software application transaction logs and/or aggregated/organized data source transaction logs with trace logs to determine any discrepancies therebetween. In some cases, the software application transaction logs and/or data source transaction logs may be compared with trace logs corresponding (approximately or exactly) in time with the aggregated and/or organized software application transaction logs and/or aggregated/organized data source transaction logs. In step 420, discrepancies detected during execution of step 420 (e.g., software application transaction log entries that do not have a corresponding data source transaction log entry, data source transaction log entries do not have a corresponding software application transaction log entry, software application transaction log entries that do not have a corresponding trace log entry, and/or data source transaction log entries that do not have a corresponding trace log entry) may be flagged or otherwise associated with an alert or notification.

Optionally, in step 424, user behavior analytics may be executed on the aggregated organized logs and/or data flows. In some cases, execution of step 424 includes using artificial intelligence and/or machine learning to perform user behavior analytics may be executed on the aggregated organized logs and/or data flows. In this process, path-based anomaly detection and velocity-based anomaly detection, etc. algorithms may be used. Exemplary user behavior analytics (UBA) may be a cybersecurity process, or set of processes, that tracks the computer network's users in order to, for example, assist with the discovery of insider threats to security, targeted attacks to a computer network or data source, and/or financial fraud. In step 426, reference models may be generated for various users and/or entities and/or scenarios using the results of the execution of step 424. In some embodiments, the reference models generated in step 426 may be used in the step 235 of process 200.

In step 428, a risk severity indicator (e.g., critical, high, medium, low; a numerical scale, a color-code scale, etc.) for each of the reference models may be determined. In some embodiments, the determined risk severity indicator may be received and/or determined in step 240. Following step 428, process 400 may proceed to step 245 of process 200.

In some embodiments, artificial intelligence, machine learning, and/or deep machine learning may be used to perform one or more steps of the processes, or portions thereof, described herein.

Figure 5A:
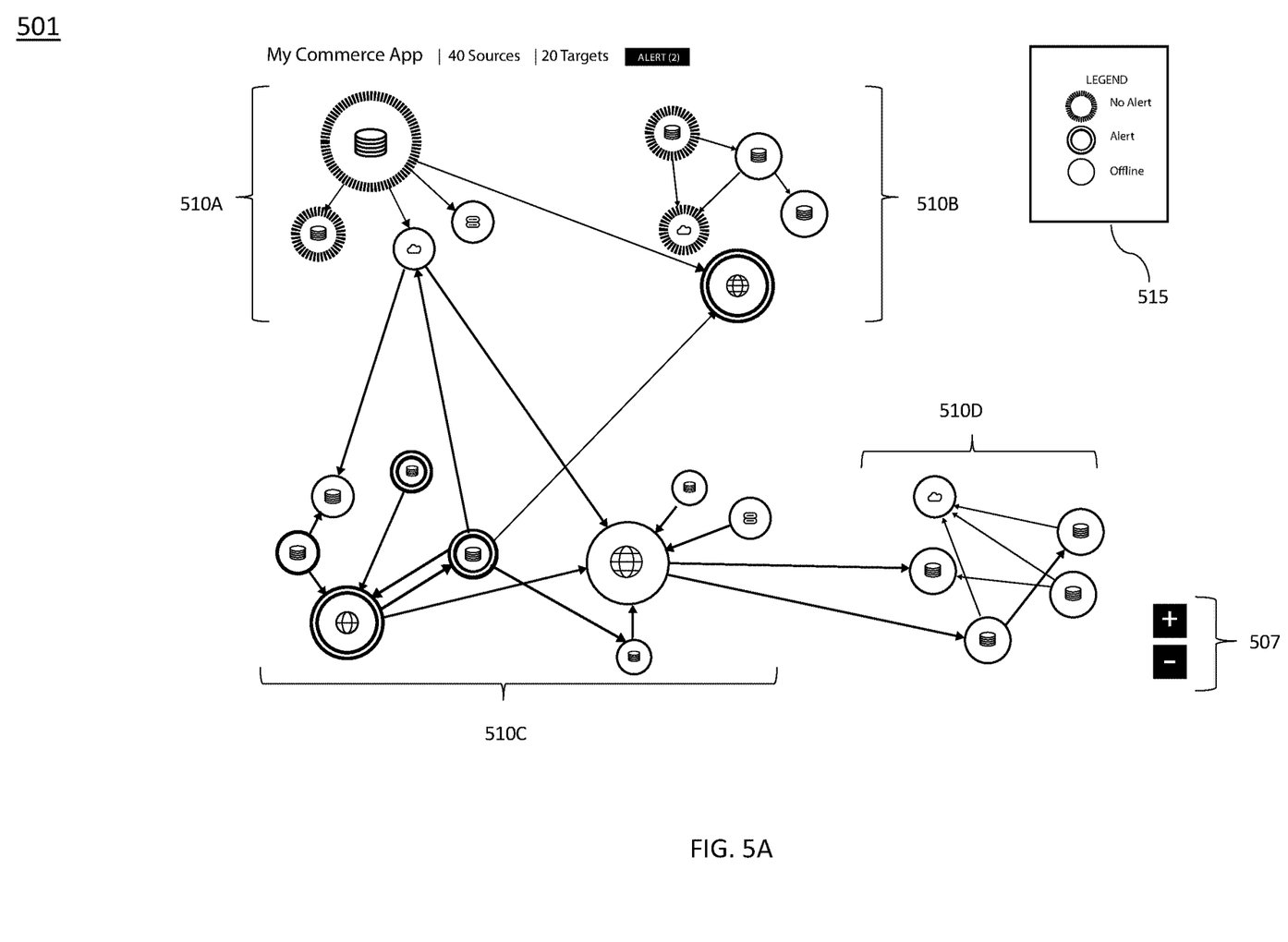
FIG. 5A, provides a first screen shot of an exemplary GUI configured to provide a user with computer network observation and/or monitoring information and information regarding data access and/or transactions performed on a computer network in the form of a map showing various nodes in a computer network and communication between the nodes over time, in accordance with some embodiments of the present invention.
Figure 5B:
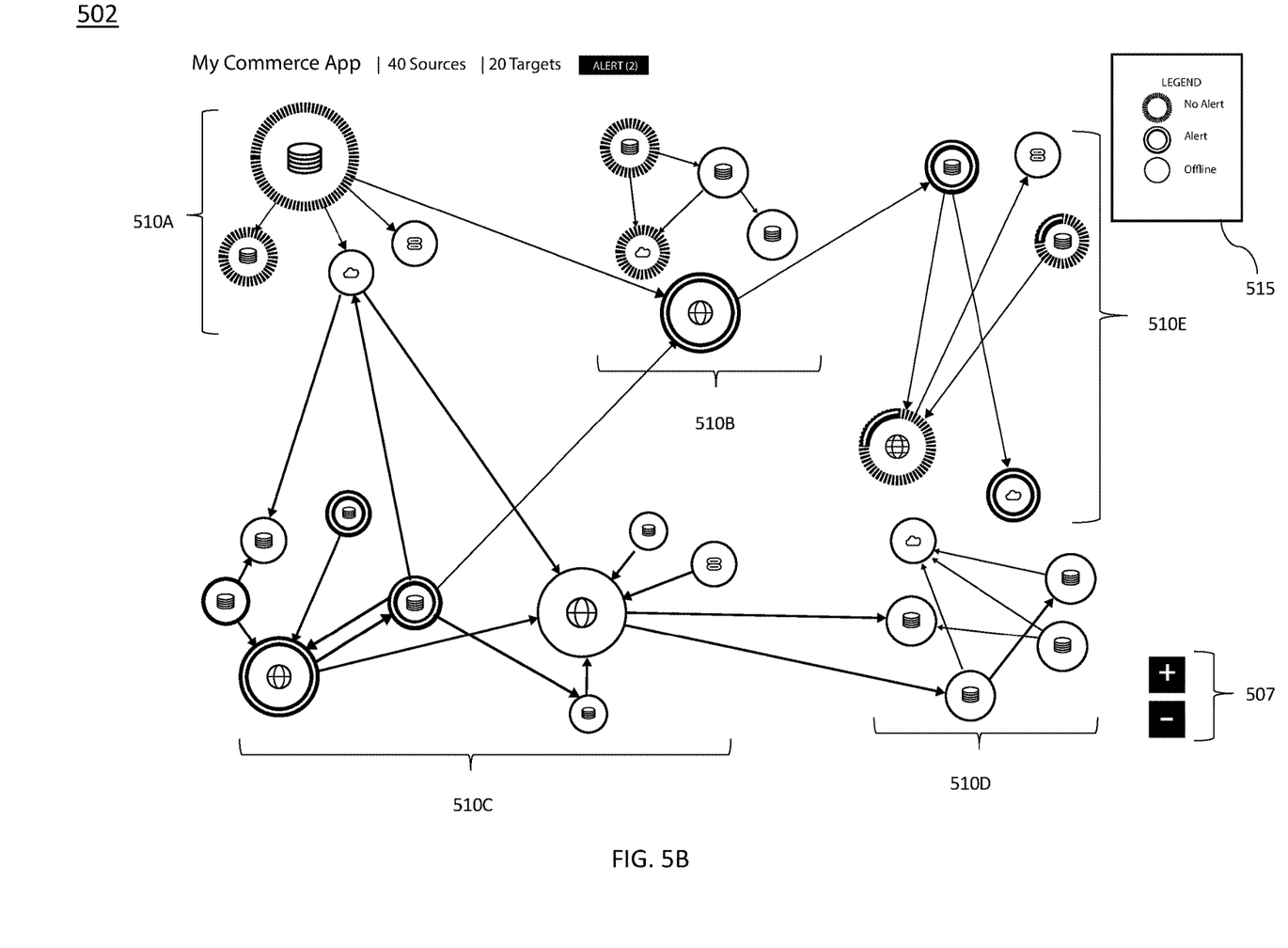
FIG. 5B provides a second screen shot of an exemplary GUI configured to provide a user with computer network observation and/or monitoring information and information regarding data access and/or transactions performed on a computer network in the form of a map showing various nodes in a computer network and communication between the nodes over time and showcasing the change from FIG. 5A, in accordance with some embodiments of the present invention.
Figure 5C:
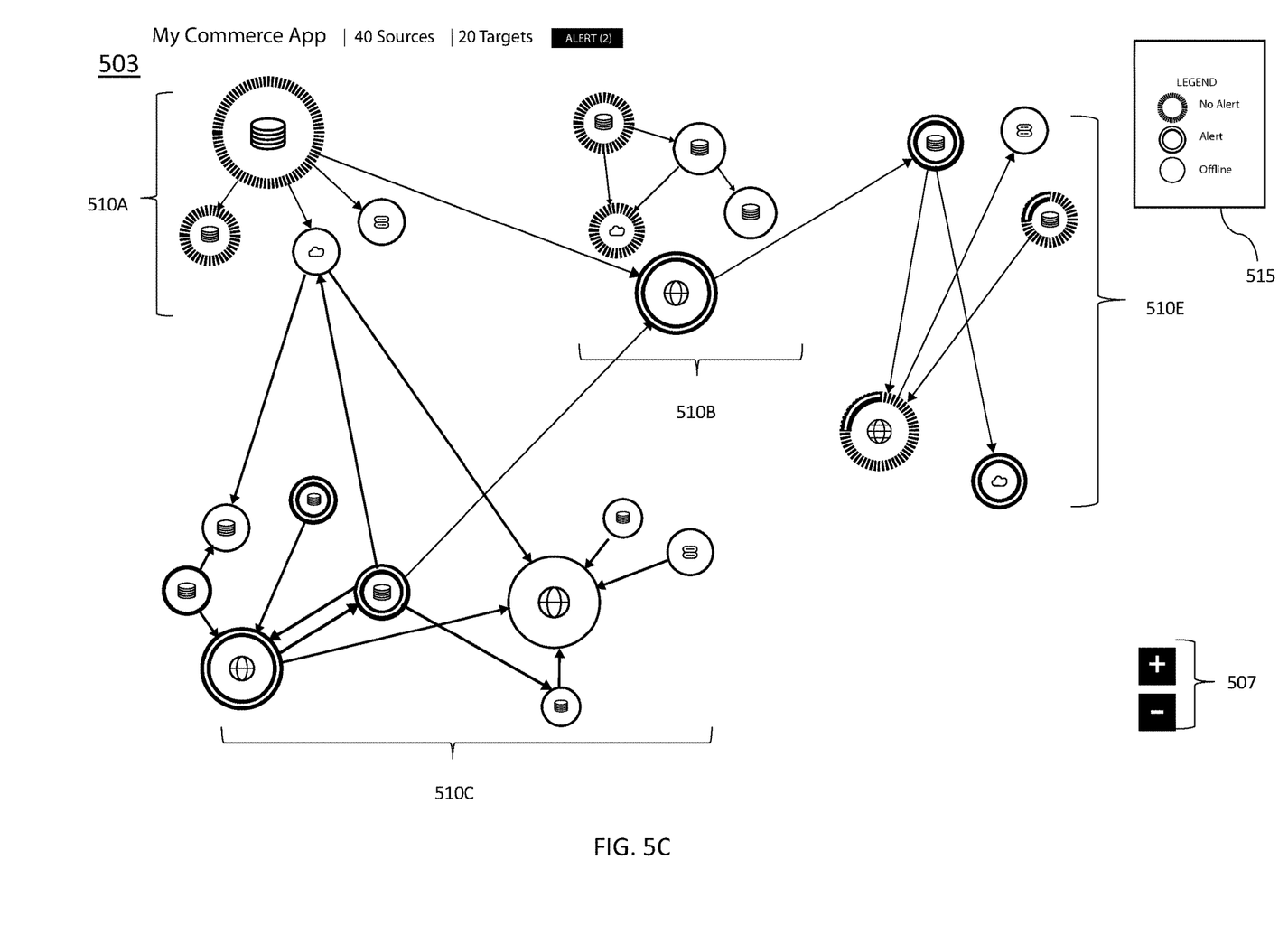
FIG. 5C provides a third screen shot of exemplary GUIs configured to provide a user with computer network observation and/or monitoring information and information regarding data access and/or transactions performed on a computer network in the form of a map showing various nodes in a computer network and communication between the nodes over time and showcasing the change from FIG. 5B, in accordance with some embodiments of the present invention.

FIGS. 5A, 5B, and 5C provide a time series of screen shots of exemplary GUIs 501, 502, and 503, respectively, configured to provide a user with a transaction map of 520A, 520B, and 520C, respectively of nodes and node clusters. These maps provide a user with computer network observation and/or monitoring information and information regarding data access and/or transactions performed on a computer network in the form of a map showing various nodes in a computer network and communication between the nodes. The time series of GUIs 501, 502, and 503 may be taken over any appropriate time interval (e.g., hours, days, weeks, etc.) on a, for example, periodic, randomly, and/or as-needed basis. Information used to generate GUIs 501, 502, and 503 may be provided by execution of one or more steps of process(es) 200, 300, and/or 400 by, for example, system 100 and/or components thereof. GUIs 501, 502, and 503 also include a key 515 that provides for three exemplary node conditions.

Transaction maps 520A, 520B, and 520C include a plurality of circular graphic elements that represent different nodes and node clusters within the computer network and lines/arrows that represent communication and/or data flows between the nodes/node clusters. The type of node shown in the transaction maps 520A, 520B, and 520C is indicated by a graphic element situated inside each circular graphic element. Exemplary types of node are datastores, cloud components, servers, web servers, application servers, databases, micro services, and other application processes. In some cases, a size of the circular graphic element indicates a number of transactions and/or a node size associated with a particular node. Transaction maps 520A, 520B, and 520C are encoded with visual information (e.g., graphic elements) to assist an observer with visually assessing, for example, potential risks for the computer network. In the example of transaction maps 520A, 520B, and 520C, a double lined circle may represent one or more alerts that are associated with the respective node, a dashed circle may indicate a lack of alerts associated with their respective node and/or usage of the node that is normal, and a single circle may indicate an off-line node or a node that has no alerts associated with it. A user may zoom in and/or zoom out of the view of the nodes provided by transaction map 520A, 520B, and/or 520C via selection of map control icons 507.

In particular, FIG. 5A shows GUI 501, which includes a first transaction map 520A showing a plurality node clusters 510A, 510B, 510C, and 510D that are present in an observed and/or monitored computer network at a time t1. By viewing first transaction map 520A provided by GUI 501, a user may be able to see network activity between nodes at a high level in order to, for example, assess overall computer network health.

FIG. 5B shows GUI 502, which includes a second transaction map 520B of the node clusters active on the observed and/or monitored computer network at a later point in time, time t2. Second transaction map 520B shows node clusters 510A, 510B, 510C, 510D, and 510E, with node cluster 510E being new (i.e., not present in first transaction map 520A). By comparing first and second transaction maps 520A and 520B, an alert condition may be recognized by the user via, for example, a display provided by monitoring and/or observing system user terminal 140, by the user's observation of a difference between the first and second transaction maps 520A and 520B and/or an alert of notification may be provided to the user when a change in a transaction map for a computer network being observed and/or monitored is detected.

FIG. 5C shows GUI 503, which includes a third transaction map 520C of the node clusters active on the observed and/or monitored computer network at a later point in time (when compared with t1 and t2), time t3. Third transaction map 520C shows node clusters 510A, 510B, 510C, and 510E, with node cluster 510D not shown in third transaction map 520C. By comparing third and second transaction maps 520C and 520B, an alert condition may be recognized by the user (e.g., monitoring and/or observing system user terminal) by the user's observation of a difference between the third and second transaction maps 520C and 520B and/or an alert of notification may be provided to the user when a change in a transaction map for a network being observed and/or monitored is detected.

Figure 5D:
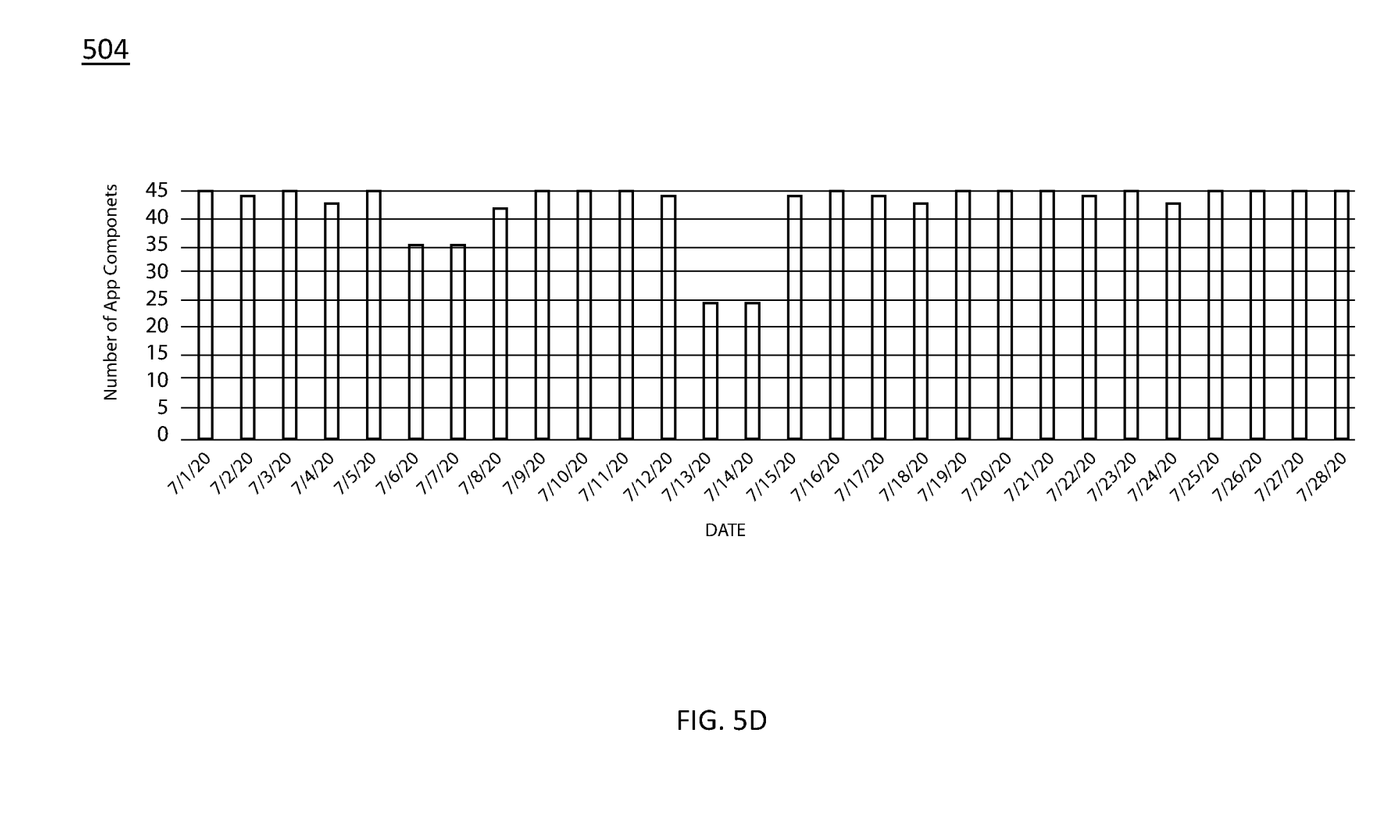
FIG. 5D shows a graph showing a number of software application components on a computer network over time, in accordance with some embodiments of the present invention.

FIG. 5D shows a graph 503 showing a number of nodes on a computer network over time. By comparing the sudden and/or significant increase or decrease in the number of nodes, an alert condition may be recognized by the user (e.g., monitoring and/or observing system user terminal) by the user's observation of a difference between the bar graphs and/or an alert of notification may be provided to the user when such a significant change in number of nodes in a network being observed and/or monitored is detected.

We claim:

1. A method for monitoring a computer network including a plurality of nodes, the method comprising:
   detecting, by a computer monitoring system, a data flow between a sequence of nodes of the computer network, the data flow being associated with a user of the computer network;
   determining, by the computer monitoring system, a characteristic of the data flow and a characteristic of the user;
   receiving, by the computer monitoring system, a software application transaction log for the computer network;
   sampling, by the computer monitoring system, data from the software application transaction log to create a plurality of software application transaction log samples, wherein frequency of the sampling is based on security risk associated with the data flow;
   classifying, by the computer monitoring system, the data flow responsive to the plurality of software application transaction log samples;
   applying, by the computer monitoring system, a machine learning algorithm configured to perform predictive path progress analysis in order to determine a level of security risk caused by the data flow responsive to a determined characteristic of the data flow, a determined characteristic of the user, and the classification of the data flow; and
   generating, by the computer monitoring system, a graphic user interface (GUI) comprising a transaction map comprising icons representing the nodes of the computer network and the data flow between the nodes over a configurable time interval and a visual indicator of the level of security risk.

2. The method for monitoring the computer network including a plurality of nodes of claim 1, further comprising:
   determining, by the computer monitoring system, a characteristic of at least one of the nodes, wherein the determining of the level of security risk caused by the data flow is further responsive to the characteristic of the at least one of the nodes.

3. The method for monitoring the computer network including a plurality of nodes of claim 1, wherein the data flow is associated with a data source, the method further comprising:
   determining, by the computer monitoring system, a characteristic of the data source; and
   classifying, by the computer monitoring system, the data flow responsive to the characteristic of the data source, wherein the determining of the level of security risk caused by the data flow is further responsive to the classification.

4. The method for monitoring the computer network including a plurality of nodes of claim 1, further comprising:
receiving, by the computer monitoring system, a trace log for the computer network;
sampling, by the computer monitoring system, data from the trace log to create a plurality of trace log sample; and
classifying, by the computer monitoring system, the data flow responsive to the plurality of trace log samples,
wherein the determining of the level of security risk caused by the data flow is further responsive to the classification.

5. The method for monitoring the computer network including a plurality of nodes of claim 1, wherein the data flow is detected by using at least one of a user name, a user identifier, a uniform resource locator (URL), a service sequence, a data source, an Internet protocol (IP) address, and a node identifier.

6. The method for monitoring the computer network including a plurality of nodes of claim 1, further comprising:
scanning, by the computer monitoring system, the computer network to discover the sequence of nodes of the computer network prior to detecting the data flow between the sequence of nodes of the computer network.

7. The method for monitoring the computer network including a plurality of nodes of claim 1, further comprising:
receiving, by the computer monitoring system, a standard for data protection, wherein the determining of the characteristic of the data flow and the level of risk caused by the data flow is determined, at least in part, using the standard for data protection.

8. The method for monitoring the computer network including a plurality of nodes of claim 1, wherein determining the characteristic of the data flow includes determining what nodes the data is flowing through.

9. The method for monitoring the computer network including a plurality of nodes of claim 1, further comprising:
receiving, by the computer monitoring system, an indication of a threshold level of security risk; and
executing, by the computer monitoring system, a remedial action responsively to a determination that the level of security risk is above the threshold level of security risk.

10. The method for monitoring the computer network including a plurality of nodes of claim 4, further comprising:
executing, by the computer monitoring system, prior to receipt of the trace log, distributed tracing within the computer network to generate the trace log.

11. The method for monitoring the computer network including a plurality of nodes of claim 1, wherein the transaction map further comprises an icon representing the user.

* * * * *